United States Patent
Beekmann et al.

(10) Patent No.: US 10,566,799 B2
(45) Date of Patent: Feb. 18, 2020

(54) METHOD FOR FEEDING ELECTRICAL POWER INTO AN ELECTRICITY SUPPLY NETWORK WITH A WIND PARK AND WIND PARK WITH BLACK START

(71) Applicant: Wobben Properties GmbH, Aurich (DE)

(72) Inventors: Alfred Beekmann, Wiesmoor (DE); Matthias Bartsch, Bremen (DE); Marcel Kruse, Beverstedt (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/144,697

(22) Filed: Sep. 27, 2018

(65) Prior Publication Data

US 2019/0036344 A1     Jan. 31, 2019

Related U.S. Application Data

(63) Continuation-in-part of application No. PCT/EP2017/057368, filed on Mar. 29, 2017.

(30) Foreign Application Priority Data

Mar. 29, 2016 (DE) .......................... 10 2016 105 662

(51) Int. Cl.
*H02J 3/38* (2006.01)
*F03D 9/30* (2016.01)
(Continued)

(52) U.S. Cl.
CPC .............. *H02J 3/386* (2013.01); *F03D 7/048* (2013.01); *F03D 9/257* (2017.02); *F03D 9/30* (2016.05);
(Continued)

(58) Field of Classification Search
USPC ....................................... 290/44, 55
See application file for complete search history.

(56) References Cited

U.S. PATENT DOCUMENTS

| 6,445,089 B1 | 9/2002 | Okui |
| 6,784,564 B1 | 8/2004 | Wobben |

(Continued)

FOREIGN PATENT DOCUMENTS

| CN | 101142731 A | 3/2008 |
| CN | 101228351 A | 7/2008 |

(Continued)

OTHER PUBLICATIONS

U.S. Appl. No. 15/034,145, filed May 3, 2016, Method for Operating a Wind Turbine.

(Continued)

*Primary Examiner* — Pedro J Cuevas
(74) *Attorney, Agent, or Firm* — Seed IP Law Group LLP

(57) ABSTRACT

A method for feeding electrical power into an electrical supply network by means of at least one wind farm respectively connected to the supply network via a network connection point, wherein the supply network is to be operated at a network frequency, and each wind farm has a plurality of wind power installations, comprising the steps of determining whether the electrical supply network is operating, starting the at least one wind farm in a black-start mode for the purpose of producing electrical power for feeding into the supply network if the supply network is not operating, operating the at least one wind farm in black-start operation in which electrical power is fed into the supply network and the supply network is operated thereby, wherein the network frequency is specified by the feeding-in of the electrical power in the black-start mode and/or during black-start operation.

17 Claims, 4 Drawing Sheets

(51) Int. Cl.
  *F03D 9/11* (2016.01)
  *F03D 9/25* (2016.01)
  *F03D 7/04* (2006.01)
  *H02J 3/40* (2006.01)

(52) U.S. Cl.
  CPC . *F03D 9/11* (2016.05); *H02J 3/40* (2013.01); *H02J 2003/388* (2013.01); *Y02E 10/723* (2013.01); *Y02E 10/725* (2013.01); *Y02E 10/763* (2013.01)

(56) References Cited

U.S. PATENT DOCUMENTS

| | | | |
|---|---|---|---|
| 6,891,281 B2 | 5/2005 | Wobben | |
| 6,924,565 B2 | 8/2005 | Wilkins et al. | |
| 6,965,174 B2 | 11/2005 | Wobben | |
| 7,197,378 B2 | 3/2007 | Sato et al. | |
| 7,391,126 B2* | 6/2008 | Liu | F03D 7/00 290/44 |
| 7,394,166 B2 | 7/2008 | Teichmann et al. | |
| 7,397,143 B2 | 7/2008 | Walling | |
| 7,525,208 B2 | 4/2009 | Wobben | |
| 7,741,728 B2 | 6/2010 | Fortmann et al. | |
| 7,800,248 B2 | 9/2010 | Krämer et al. | |
| 7,908,036 B2 | 3/2011 | Kirchner et al. | |
| 7,952,214 B2 | 5/2011 | Ichinose et al. | |
| 7,983,799 B2 | 7/2011 | Bose et al. | |
| 8,000,840 B2* | 8/2011 | Nielsen | F03D 7/026 700/286 |
| 8,049,352 B2 | 11/2011 | Jørgensen et al. | |
| 8,084,874 B2 | 12/2011 | Llorente González | |
| 8,108,079 B2 | 1/2012 | Wobben | |
| 8,120,202 B2* | 2/2012 | Larsen | H02J 3/02 307/31 |
| 8,242,753 B2 | 8/2012 | Engelhardt et al. | |
| 8,312,733 B2 | 11/2012 | Tsarev et al. | |
| 8,395,360 B2 | 3/2013 | Tripathi et al. | |
| 8,692,419 B2 | 4/2014 | Fortmann et al. | |
| 8,698,461 B2 | 4/2014 | Engelhardt et al. | |
| 8,779,610 B2 | 7/2014 | Luetze | |
| 8,934,270 B2 | 1/2015 | Letas | |
| 8,957,536 B2 | 2/2015 | Gupta et al. | |
| 8,981,708 B2 | 3/2015 | Diedrichs et al. | |
| 8,994,202 B2 | 3/2015 | Gupta et al. | |
| 9,048,694 B2* | 6/2015 | Pan | H02J 3/36 |
| 9,099,936 B2* | 8/2015 | Gupta | H02M 5/44 |
| 9,106,152 B2 | 8/2015 | De Brabandere et al. | |
| 9,166,509 B2 | 10/2015 | Egedal et al. | |
| 9,209,711 B2 | 12/2015 | Farkas | |
| 9,217,418 B2* | 12/2015 | Bodewes | F03D 7/0284 |
| 9,279,411 B2 | 3/2016 | Beekmann et al. | |
| 9,461,572 B2 | 10/2016 | Wessels | |
| 9,502,991 B2* | 11/2016 | Lin | H02M 7/145 |
| 9,509,141 B2 | 11/2016 | Egedal et al. | |
| 9,520,801 B1* | 12/2016 | She | H02M 7/213 |
| 9,677,544 B2 | 6/2017 | Li et al. | |
| 9,705,334 B2 | 7/2017 | Giertz | |
| 9,748,857 B2* | 8/2017 | She | H02J 3/36 |
| 9,812,872 B2 | 11/2017 | Benesch et al. | |
| 9,831,678 B2* | 11/2017 | Premm | H02J 3/383 |
| 9,957,952 B2 | 5/2018 | Giertz | |
| 9,960,603 B2* | 5/2018 | Dorn | F03D 9/10 |
| 10,128,657 B2* | 11/2018 | Huang | H02J 3/34 |
| 10,156,225 B2* | 12/2018 | Huang | H02J 3/386 |
| 10,333,386 B2* | 6/2019 | Ermisch | H02H 7/1255 |
| 10,428,797 B2* | 10/2019 | Scott | F03D 17/00 |
| 2002/0036911 A1 | 3/2002 | Okui | |
| 2004/0207264 A1 | 10/2004 | Sato et al. | |
| 2005/0040655 A1 | 2/2005 | Wilkins et al. | |
| 2005/0225090 A1 | 10/2005 | Wobben | |
| 2008/0001408 A1* | 1/2008 | Liu | F03D 7/00 290/44 |
| 2008/0084070 A1* | 4/2008 | Teichmann | H02J 3/38 290/55 |
| 2008/0143304 A1 | 6/2008 | Bose et al. | |
| 2008/0239770 A1 | 10/2008 | Punzet et al. | |
| 2008/0252076 A1 | 10/2008 | Fortmann et al. | |
| 2008/0252143 A1 | 10/2008 | Llorente Gonzalez et al. | |
| 2008/0284172 A1* | 11/2008 | Nielsen | F03D 7/026 290/44 |
| 2008/0296898 A1 | 12/2008 | Ichinose et al. | |
| 2009/0206603 A1 | 8/2009 | Llorente Gonzalez | |
| 2010/0013224 A1 | 1/2010 | Edenfeld | |
| 2010/0119370 A1 | 5/2010 | Myhr | |
| 2010/0138058 A1 | 6/2010 | Kirchner et al. | |
| 2010/0298991 A1 | 11/2010 | Alonso Sadaba et al. | |
| 2010/0332042 A1 | 12/2010 | Riesberg et al. | |
| 2011/0140511 A1* | 6/2011 | Larsen | H02J 3/02 307/2 |
| 2012/0061959 A1 | 3/2012 | Yasugi et al. | |
| 2012/0146423 A1* | 6/2012 | Bodewes | F03D 7/0284 307/84 |
| 2012/0261917 A1 | 10/2012 | Egedal et al. | |
| 2012/0268081 A1 | 10/2012 | Tripathi et al. | |
| 2013/0015660 A1 | 1/2013 | Hesselaek et al. | |
| 2013/0043825 A1 | 2/2013 | Diedrichs et al. | |
| 2013/0141951 A1 | 6/2013 | Adloff | |
| 2013/0147442 A1 | 6/2013 | Tripathi et al. | |
| 2013/0170254 A1 | 7/2013 | Letas | |
| 2013/0182345 A1 | 7/2013 | De Brabandere et al. | |
| 2013/0197704 A1* | 8/2013 | Pan | H02J 3/36 700/287 |
| 2013/0221934 A1 | 8/2013 | Wakasa et al. | |
| 2013/0249215 A1 | 9/2013 | Egedal et al. | |
| 2013/0300116 A1 | 11/2013 | Egedal et al. | |
| 2014/0084587 A1 | 3/2014 | Beekmann | |
| 2014/0146582 A1* | 5/2014 | Gupta | H02M 7/7575 363/35 |
| 2014/0225369 A1* | 8/2014 | Bodewes | F03D 7/04 290/44 |
| 2014/0225446 A1 | 8/2014 | Giertz | |
| 2014/0268926 A1* | 9/2014 | Gupta | H02M 5/44 363/35 |
| 2014/0362623 A1 | 12/2014 | Farkas | |
| 2014/0375054 A1* | 12/2014 | Kang | F03D 7/0284 290/44 |
| 2015/0014992 A1* | 1/2015 | Andresen | F03D 7/0284 290/44 |
| 2015/0042092 A1* | 2/2015 | Nelson | H02J 3/386 290/44 |
| 2015/0124496 A1* | 5/2015 | Yu | H02M 1/36 363/35 |
| 2015/0145252 A1* | 5/2015 | Lin | H02M 7/145 290/44 |
| 2015/0198145 A1 | 7/2015 | Diedrichs et al. | |
| 2015/0260161 A1* | 9/2015 | Son | F03D 7/06 290/44 |
| 2015/0280629 A1 | 10/2015 | Diedrichs et al. | |
| 2015/0333678 A1* | 11/2015 | Son | H02P 9/04 290/44 |
| 2015/0365031 A1 | 12/2015 | Wessels | |
| 2015/0380942 A1* | 12/2015 | Premm | H02J 3/383 307/52 |
| 2015/0381089 A1* | 12/2015 | Tarnowski | H02J 3/24 307/84 |
| 2016/0084892 A1 | 3/2016 | Nielsen | |
| 2016/0087445 A1 | 3/2016 | Beekmann et al. | |
| 2016/0134121 A1 | 5/2016 | Bartsch | |
| 2016/0146192 A1* | 5/2016 | Kurthakoti Chandrashekhara | H02M 5/44 290/44 |
| 2016/0161538 A1 | 6/2016 | Wang et al. | |
| 2016/0173017 A1 | 6/2016 | Beekmann | |
| 2016/0201647 A1* | 7/2016 | Dysarsz | C25B 1/04 320/137 |
| 2016/0226258 A1 | 8/2016 | Giertz | |
| 2016/0254668 A1* | 9/2016 | Huang | H02J 3/34 307/64 |
| 2016/0273520 A1 | 9/2016 | Giertz | |
| 2017/0005478 A1* | 1/2017 | Dorn | F03D 9/10 |
| 2017/0047837 A1* | 2/2017 | Ermisch | H02M 1/32 |

(56) References Cited

U.S. PATENT DOCUMENTS

| | | | |
|---|---|---|---|
| 2017/0047857 A1* | 2/2017 | She | H02J 3/36 |
| 2017/0074244 A1 | 3/2017 | Huang et al. | |
| 2017/0077711 A1 | 3/2017 | Oesselke et al. | |
| 2017/0126103 A1* | 5/2017 | Hunt | H02K 19/26 |
| 2017/0214312 A1* | 7/2017 | Schmitt | H01F 7/40 |
| 2017/0234299 A1 | 8/2017 | Kjaer et al. | |
| 2019/0145376 A1* | 5/2019 | Hardwicke, Jr. | H02J 3/386 |
| | | | 700/287 |

FOREIGN PATENT DOCUMENTS

| | | | |
|---|---|---|---|
| CN | 101467343 A | | 6/2009 |
| CN | 102150356 A | | 8/2011 |
| CN | 104953616 A | | 9/2015 |
| DE | 10044096 A1 | | 4/2002 |
| DE | 10320087 A1 | | 12/2004 |
| DE | 102006027465 A1 | | 12/2007 |
| DE | 102005049426 B4 | | 12/2009 |
| DE | 102008037449 B4 | | 10/2010 |
| DE | 102011007037 A1 | | 1/2012 |
| DE | 102005041927 B4 | | 2/2013 |
| DE | 102013222452 A1 | | 5/2015 |
| EP | 1775819 A2 | | 4/2007 |
| EP | 1909371 A2 | | 4/2008 |
| EP | 1965483 A1 | | 9/2008 |
| EP | 2187048 A1 | | 5/2010 |
| EP | 2632012 A1 | | 8/2013 |
| EP | 2645522 A1 | | 10/2013 |
| JP | 4325832 A | | 11/1992 |
| JP | 2008283856 A | | 11/2008 |
| JP | 2013110936 A | | 6/2013 |
| KR | 1020130085830 A | | 7/2013 |
| RU | 2221165 C2 | | 1/2004 |
| RU | 2011142739 A | | 4/2013 |
| WO | 0074198 A1 | | 12/2000 |
| WO | 2004099604 A2 | | 11/2004 |
| WO | 2005031941 A1 | | 4/2005 |
| WO | 2009083445 A1 | | 7/2009 |
| WO | 2012000508 A2 | | 1/2012 |
| WO | 2012076015 A2 | | 6/2012 |
| WO | 03058063 A1 | | 7/2013 |

OTHER PUBLICATIONS

Hansen et al., "Centralised power control of wind farm with doubly fed induction generators," *Renewable Energy* 31:935-951, Aug. 10, 2005.

* cited by examiner

METHOD FOR FEEDING ELECTRICAL POWER INTO AN ELECTRICITY SUPPLY NETWORK WITH A WIND PARK AND WIND PARK WITH BLACK START

BACKGROUND

Technical Field

The present invention relates to a method for feeding electrical power into an electrical supply network by means of at least one wind farm. In addition, the present invention relates to a wind farm and the present invention also relates to a control apparatus for carrying out a method according to the invention and to a control apparatus for controlling a wind farm according to the invention.

Description of the Related Art

It is known practice to feed electrical power into an electrical supply network by means of wind power installations, in particular by means of a plurality of wind power installations which are combined in a farm and feed power into the electrical supply network via a common network connection point. The practice of feeding power into the same electrical supply network at different network connection points using a plurality of wind farms is also known.

Such methods fundamentally presuppose that the network is operating. Although methods are also known in which faults in the network are also taken into account by wind power installations, the electrical supply network is nevertheless operating in this case even if there is a short-term fault. Even if there is a complete voltage dip for a short time, the electrical supply network nevertheless regularly returns and the wind power installations or wind farms can continue to feed in their power.

For example, the international application WO 2005/031941 A1 thus describes a method in which, if a fault occurs in the electrical network, a wind power installation remains connected to the network and, when the fault ends, feeds a considerably higher amount of power into the network in order to support the network in this case. However, only an existing network which is operating and has also independently returned to operation again without a fault is supported in this case too.

These concepts are based on the fundamental idea that an electrical supply network is at least also supplied and guided by a large power plant. In this case, a very large synchronous generator is regularly directly coupled to the network, which synchronous generator undertakes this guidance task and also specifies a network frequency in the process. The decentralized feeders and wind power installations or wind farms can then be oriented thereto.

Island networks which are therefore small and self-contained, in particular if they are actually arranged on a (small) island, then regularly have a so-called network former. This may be, for example, a synchronous generator which is driven by an internal combustion engine, in particular a diesel engine. Such a system is described in the published patent application DE 100 44 096 A1. Therefore, the network is ultimately also guided by a directly coupled synchronous generator there.

It may now be problematic if the electrical supply network has completely failed, in particular after a blackout, and has to be reactivated. A similar situation also applies to initial activation of an electrical supply network, but this situation can scarcely still occur nowadays, with the exception of small island networks which are not the subject of this application, however. In the case of such reactivation, the large power plant will fundamentally resume operation by means of its synchronous generator. For this purpose, the one or more large power plants are started up again and consumers are then gradually connected at corresponding network switching points.

However, such a system cannot function if such large power plants with synchronous generators are not connected to the electrical supply network to be reactivated. Such a problem can also occur for a relatively large subnetwork which has been disconnected if a local blackout has occurred, for example.

One possibility could be to provide network formers for such situations, as is carried out in the case of island networks. However, this would have the disadvantage that such network formers would have to be kept available only for such reactivation operations and are therefore usually not required since such reactivation or initial activation occurs very rarely.

The German Patent and Trademark Office researched the following prior art in the priority application for the present application: DE 103 20 087 A1, EP 1 965 483 A1, EP 1 909 371 A2, EP 2 632 012 A1, US 2015/0042092 A1, CN 104953616A, DE 100 44 096 A1, WO 2005/031941 A1.

BRIEF SUMMARY

Provided is a method for activating or reactivating an electrical supply network or a part of the latter without using a large power plant with a directly coupled synchronous generator. The intention is at least to propose an alternative solution to previously known solutions.

This method is based on a wind farm which is connected into the supply network via a network connection point and is intended to feed electrical power into the supply network via this network connection point. This electrical supply network, or simply a supply network, is to be operated at a network frequency, for example 50 Hz or 60 Hz. Provision may also be made for power to be fed in using a plurality of wind farms, wherein each wind farm has a plurality of wind power installations and a wind farm is respectively connected to the supply network via a separate network connection point and feeds in power via the latter.

The method now proposes the practice of first of all determining whether the electrical supply network is operating. This determination can be carried out, in particular, by the at least one wind farm, and a central controller of the wind farm may be present and used for this purpose. The practice of using a superordinate control device also comes into consideration, in particular if a plurality of wind farms are involved.

If it is determined that the supply network is not operating, the at least one wind farm is started in a black-start mode in order to produce electrical power and feed it into the supply network.

The at least one wind farm which was started in the black-start mode is now operated in black-start operation. During this black-start operation, electrical power is fed into the supply network and the supply network is operated thereby, in particular is also reactivated. In this black-start mode or black-start operation, the network frequency is specified by the feeding-in of the electrical power. The network frequency is therefore specified by the at least one wind farm feeding in power.

The proposed method therefore provides a possible way of reactivating an electrical supply network which is not operating, that is to say has suffered a blackout in particular, without requiring a large power plant for this purpose, in particular without requiring a large power plant having a synchronous generator which is directly coupled to the network and specifies the network frequency. The wind farm, possibly a plurality of wind farms, therefore detect(s) that the network is not operating and independently start(s) it up.

In this case, an electrical supply network is not understood as meaning an island network, but rather an electrical supply network which is not isolated and, in particular, does not have the one or more wind farms and possibly further decentralized production units as the only producers. The electrical supply network which is taken as a basis here is coupled, during normal operation, to at least one large power plant which feeds power into this electrical supply network. This may also comprise the fact that the electrical supply network, which was determined not to be operating, is currently not coupled to a large power plant because such a power plant has been disconnected from the electrical supply network and/or is connected to another subnetwork and this subnetwork has been disconnected from that electrical supply network which was determined not to be operating. In this case, after the electrical supply network has been started and after this electrical supply network has been activated or reactivated, it is possible to subsequently establish a connection to said subnetwork and/or to said large power plant in order to ultimately establish normal operation of the electrical supply network again.

The electrical supply network considered here can form part of the European integrated network, for example.

The method therefore provides a possible way of being automatically activated without such a large power plant, and this has the advantage that such activation can be carried out without a corresponding large power plant. It is therefore possible to carry out activation if a connection to a large power plant is currently disconnected. However, this also has the advantage that activation, in particular reactivation, can possibly be carried out more quickly than would be the case with one or more large power plants. This is due to the fact, in particular, that wind power installations can carry out control in a very fast and flexible manner using inverters.

If an electrical supply network has failed, this should regularly be classified as a serious fault. Such a fault often results in many or all large power plants which feed power into this electrical supply network being disconnected. Accordingly, these large power plants, or at least some of them, would have to be first of all reactivated in order to reactivate the electrical supply network or power plants which are provided specifically for a black start have to be started. Reactivation by means of a wind farm, which is proposed here, can therefore possibly provide an improved solution, in particular can achieve faster reactivation.

One embodiment proposes that the wind farm is connected to the supply network via the respective network connection point, wherein the supply network is not operating, in particular does not have a network frequency, before connection, and the supply network has the network frequency after connection as a result of the at least one wind farm feeding in power. The supply network is therefore initially not operating. It does not have a network frequency, in particular, which, in this respect, can also be used as an indicator of the fact that the supply network is not operating. Only the connection to the wind farm and the feeding-in of electrical power by the wind farm at the corresponding frequency therefore specified by the wind farm result in the supply network then having a network frequency.

During black-start operation, a frequency generator preferably generates a frequency signal and optionally also a phase signal. The at least one wind farm can be provided with said signal(s) as a control signal, and the at least one wind farm then sets the frequency and possibly the phase on the basis of this control signal. In particular, such a frequency generator is part of the at least one wind farm which reactivates the electrical supply network here. If a plurality of wind farms are used to activate the one electrical supply network, this frequency generator can provide all of these involved wind farms with the frequency signal and optionally the phase signal as a control signal. In this case in particular, it is proposed to provide the frequency generator as a superordinate control means for the plurality of wind farms. The frequency generator or this superordinate control means can be locally arranged in one of the wind farms.

One configuration proposes that one of the wind power installations operates as a master installation for specifying the frequency and optionally for specifying the phase and the remaining wind power installations are adapted thereto, in particular are synchronized therewith. Additionally or alternatively, it is proposed that, if a plurality of wind farms are used, one wind farm operates as a master farm for specifying the frequency and optionally for specifying the phase and the remaining wind farms are adapted thereto, in particular are synchronized therewith. This makes it possible to easily specify a frequency as a control frequency and optionally a phase as a control phase. In this respect, the master installation or the master farm can operate as a frequency generator or superordinate control means. In this respect, the advantages and features of the frequency generator described above can be analogously applied to this master installation or this master farm.

Electrical energy from an energy store is preferably used to start the at least one wind farm. Energy from the energy store is optionally also used to feed in at least some of the electrical power to be fed in.

An energy store should be accordingly provided, which energy store can be centrally arranged in the wind farm, for example. If this energy store is comparatively small or has a comparatively small charge, it may be useful to use the energy only to start the at least one wind farm, that is to say as energy for the operating devices, for example blade adjustment drives, and a respective excitation current for exciting the rotor field of a separately excited synchronous generator of a wind power installation in each case. Control processors, including an inverter, can also be supplied with such energy from an energy store.

If an accordingly large energy store is provided, its energy can also be used to directly feed in power. This makes it possible to achieve the situation in which the electrical supply network can be reactivated even when there is little wind or even no wind at all at the time at which the electrical supply network is intended to be reactivated. Battery stores come into consideration as electrical energy stores, in particular as direct electrical energy stores. However, electrical energy stores which store the energy in another form but withdraw, that is to say can output, this energy, in particular, as electrical energy also come into consideration. Gas stores, in particular, also come into consideration in this respect. Electrical capacitors can supplement the electrical stores, in particular in the case of electrical battery stores. The practice of combining battery stores and other stores and possibly additionally capacitor stores also comes into consideration as a particularly preferred embodiment. As a result, electrical powers can be provided by the different stores at different speeds. It is therefore possible to advantageously combine different properties with regard to the speed at which the energy is provided, on the one hand, and the storage capacity in terms of the amount of energy, on the other hand.

One configuration proposes that, before starting the at least one wind farm, a network impedance is captured at at least one of the respective network connection points in order to check an operational capability of the supply network. Therefore, the operational capability is additionally checked between the determination of whether the electrical supply network is operating. Capturing the network impedance makes it possible to detect, in particular, whether there is still a network short circuit or whether the network connection point, at which the network impedance is captured, is disconnected from the electrical supply network or from a large part of the electrical supply network or whether there is another fault. A comparison impedance or a comparison network impedance was preferably recorded at at least one earlier time, in particular when the electrical supply network was operating, that is to say without a fault. A comparison of the network impedance now captured at the network connection point with such a comparison network impedance may provide information on whether the network impedance now captured indicates a problem, in particular indicates that there might not be any operational capability.

Additionally or alternatively, it is proposed that the starting in the black-start mode is adapted to the captured network impedance. The following can depend on this, in particular: how much power and/or reactive power is initially fed in, how quickly the voltage used for feeding in power is increased, and, in particular, also how stable the control of the feeding-in is. It is proposed, in particular, to provide a control reserve on the basis of the captured network impedance. In this case, a control reserve is understood as meaning how large the relative, that is to say percentage, distance is between the power which has been fed in or the power to be fed in and the computational feed-in power at which a stability limit was calculated, at which the feeding-in would therefore become unstable.

The wind farm is preferably not started if the captured network impedance reveals that there is no operational capability of the supply network. This is the case, in particular, when the network impedance is particularly large or particularly small. However, the network impedance can also qualitatively indicate that an operational capability is not available or is at least problematic. This may be the case, for example, when the network impedance has a very high or a very low non-reactive component.

During or immediately after the starting of the at least one wind farm in the black-start mode, at least one consumer connected to the supply network is preferably connected in order to serve as a load for the power fed into the supply network, with the result that an electrical current can flow to this at least one consumer in the supply network.

Such a consumer may be an artificial consumer, that is to say a consumer which is provided solely for network support, in particular the starting in the black-start mode described here. This may be, for example, an electric motor and/or resistor banks for discharging electrical energy. This load is preferably configured such that it tolerantly reacts to voltage fluctuations, frequency fluctuations and fluctuations in available power.

A rotating electrical machine, in particular with a flywheel mass, which can operate both in motor operation and in generator operation, can be provided as the load in a particularly preferred manner. This electrical machine can then be used as the load, can receive power and can convert this power into a rotational movement. This power which is initially fed in or the energy which is integrated over time in the process can accelerate this rotating electrical machine, with the result that the electrical energy is stored as kinetic rotational energy. This rotational energy can be subsequently output to the network again and would therefore not be lost, at least partially. In addition, such a rotating electrical machine can also output the energy again if necessary if the wind farm is still being operated in the black-start mode and/or black-start operation.

A wind power installation in another wind farm and/or another wind farm preferably form(s) the connectable load. The use of the wind power installation or the wind farm as the load has the advantage that this wind power installation or this wind farm can be started up at the same time as a result. This wind power installation or this other wind farm then initially supports the activation of the electrical supply network as the load but can then operate all the faster than a production unit or units as soon as required. This can be required, in particular, when further consumers are connected to this electrical supply network during black-start operation.

The starting in the black-start mode is preferably initiated by means of an external signal from an operator of the electrical supply network or by means of an external signal from a central control unit. This external signal can therefore also be used to determine whether the electrical supply network is operating, that is to say to determine that the electrical supply network is not operating. Additionally or alternatively, such an external signal can be used to determine the operational capability of the electrical supply network. Accordingly, the network operator and/or the central control unit can determine whether the electrical supply network is operational.

One preferred configuration proposes that, before starting in the black-start mode, a subnetwork of the supply network that is connected to the network connection point is disconnected in order to be started and operated independently of the remaining part of the supply network. In addition, it is proposed, as an additional option, that, in a further step, the subnetwork which has been disconnected and is operated in black-start operation is synchronized with the remaining part of the supply network or with a part of the latter and is then connected again.

Therefore, a subnetwork is disconnected from an entire electrical supply network, for example the European integrated network, and can be started up independently of the remaining part of the supply network. The remaining electrical supply network can likewise be started up in a different manner. The at least one wind farm therefore needs to start only this subnetwork which has been disconnected. The impedance was preferably also previously captured for this subnetwork when the electrical supply network was substantially still running in an optimum state. In this case, it is also possible to extrapolate from an impedance measured in the subnetwork which has not been disconnected to an impedance which would arise in a correspondingly disconnected subnetwork.

In a further step, the subnetwork which has been disconnected and is operated in black-start operation is preferably synchronized with the remaining part of the supply network or with a part of the latter and is then connected again. A plurality of subnetworks, at least two subnetworks, can therefore be started up independently of one another, in particular until they operate in a stable manner. These subnetworks which are initially started up separately can then be synchronized and reconnected.

The supply network preferably has at least one consumer and a conventional production unit. In particular, the electrical supply network has a very large number of consumers. Therefore, the use of a fundamentally conventional supply network is proposed here. The conventional production unit preferably has a nominal power of more than 200 MW. A conventional production unit which is also referred to here as a large power plant is therefore provided. Additionally or alternatively, the conventional production unit has a synchronous generator coupled directly to the supply network. A supply network having a fundamentally conventional producer, namely a producer other than a wind power installation or a wind farm, is therefore assumed. This conventional production unit is therefore constructed in such a manner that it has a synchronous generator which is directly coupled to the network. In this respect, such a synchronous generator would also be able to specify a frequency in the network.

In this case, provision is made for this conventional production unit to be disconnected from the supply network if the supply network is not operating. Such an electrical supply network is therefore reactivated by one or more wind farms, rather than by the conventional production unit.

One configuration proposes that at least two wind farms are provided and these wind farms are started in a synchronous manner, in particular are started up in a synchronous manner, wherein they are matched to one another at least in terms of their frequency and phase angle, wherein one of the wind farms preferably operates as a master farm and the other farm(s) conform(s) to this master farm. This makes it possible to easily reactivate the electrical supply network by means of two or more wind farms. These at least two wind farms can therefore already be supplemented in terms of the level of, in particular, their power which can be output, that is to say active power, and their reactive power which can be output. In this respect, these at least two wind farms are also erected locally at a distance from one another, and a certain homogenization with respect to the wind availability can also be carried out. If these wind farms are far enough apart, wind changes, in particular gusts, can be at least partially averaged out. This advantage takes effect, in particular, if more than two, in particular considerably more than two, wind farms are used.

A plurality of wind farms can be easily coordinated by providing one wind farm as a master farm.

A plurality of wind farms are preferably used, and the wind farms interchange data with one another in order to prepare for a joint start in the black-start mode, wherein the wind farms interchange at least data relating to their available power and/or power required in the supply network, and, on the basis of this, control the start in the black-start mode with subsequent operation in black-start operation and/or derive therefrom whether a start in the black-start mode with subsequent operation in black-start operation is possible.

Data communication between the wind farms is therefore provided. In particular, data relating to the available power and/or power required in the supply network are interchanged in this case. The available power of a wind farm depends, in particular, on the strength of the prevailing wind in the farm. However, other information also comes into consideration, for example whether all wind power installations in the farm can be activated or whether one or more wind power installations are in a repair mode, to name just one example. These data can then be used to better plan and coordinate the activation or reactivation of the electrical supply network. It is also considered that evaluation of these data reveals that activation or reactivation of the electrical supply network is currently not possible.

The relevant farm preferably takes into account the prevailing wind, the expected wind and/or properties and size of storage devices present in the farm in order to determine available power.

The meaning of prevailing wind has already been explained and the prevailing wind has a great influence on how much power can actually be taken from the wind and can therefore be provided for feeding in.

A weather forecast is preferably concomitantly considered when considering the expected wind. This weather forecast can be obtained from a central meteorological institute, for example the Federal Maritime and Hydrographic Agency in Germany. As a further possibility, it is proposed that the wind farm itself determines a forecast, in particular from recorded weather data, such as the change in the air pressure, the temperature and the prevailing wind. Meteorological data from a plurality of wind farms are preferably evaluated for this purpose. Meteorological data from wind farms which are not involved in the activation of this electrical supply network are preferably also used in this case.

Properties and the size of storage apparatuses present in the farm can also be taken into account in order to determine available power. On the basis of such storage apparatuses, it is possible to assess how quickly the farm can be started up and/or how much energy and therefore power can be directly fed in from the storage apparatuses, that is to say how much electrical energy which can be fed in is available irrespective of the wind.

Moreover, such electrical storage apparatuses need not be directly arranged in the wind farm, wherein an arrangement in the farm is a preferred embodiment.

Provided is a control apparatus for controlling the feeding of electrical energy into an electrical supply network. In this case, the power is fed in by means of at least one wind farm respectively connected to the supply network via a network connection point, and the supply network is operated at a network frequency, in particular at 50 Hz or 60 Hz, as already described above. Each wind farm has a plurality of wind power installations, and the control apparatus comprises a capture device for determining whether the electrical supply network is operating. The capture device is provided, in particular, for the purpose of measuring or evaluating corresponding measured values in order to determine whether a frequency is present, that is to say can be detected, in the network.

The control apparatus also has a signal generator which can generate and transmit a starting signal. Such a starting signal is provided for the purpose of starting the at least one wind farm, which is intended to feed power into the supply network, in a black-start mode. In this mode, the wind farm produces electrical power and feeds it into the supply network. Such a starting signal is provided when the supply network is not operating, that is to say when the capture device has determined that the electrical supply network is not operating.

Also provided as part of the control apparatus is a guide unit which guides the at least one wind farm during black-start operation. During this black-start operation, electrical power is fed into the supply network by the at least one wind farm and the supply network is operated thereby. The guide unit can guide the at least one wind farm at least in such a manner that it can specify the active power to be fed in, the reactive power to be fed in and/or their ratio with respect to one another. Additionally or alternatively, it can guide the at least one wind farm in such a manner that it specifies the voltage level with which power is fed in during black-start operation or in the black-start mode. For example, it can slowly increase such a voltage value and can guide the wind farm in such a manner that the latter receives specifications for accordingly increasing the voltage.

In this black-start mode and/or black-start operation, the network frequency is therefore also specified only by the feeding-in of the electrical power by the at least one wind farm.

The control apparatus is preferably prepared to carry out a method according to at least one of the embodiments described above and/or to guide a wind farm or a plurality of wind farms in such a manner that it/they feed(s) electrical power into the electrical supply network according to a method according to one of the embodiments described above.

It is therefore proposed that the control apparatus coordinates the black start of the electrical supply network.

Provided is a wind farm having a plurality of wind power installations, which wind farm is prepared to carry out a method according to at least one of the embodiments described above or to take part in such a method. Therefore, the wind farm can carry out such a method even without the control apparatus mentioned or can take part in carrying out the method even without such a control apparatus. For example, the wind farm or one of the wind farms can undertake the coordination in this case.

Additionally or alternatively, such a wind farm is prepared to be functionally coupled to a control apparatus according to at least one of the embodiments described above. In particular, this wind farm is prepared to receive the starting signal from the control apparatus and additionally or alternatively to be guided by the guide unit of the control apparatus during black-start operation. In this case, the wind farm is adapted to the control apparatus both with regard to interfaces and with regard to functional compatibility.

Provided is a wind power installation prepared for operation in a wind farm according to one embodiment described above. Such a wind power installation can therefore contribute to complying with the accordingly required electrical values. In particular, it can contribute some of the active power and/or reactive power to be fed in. It can preferably have a ratio of active power to reactive power which corresponds to the ratio fed in by the wind farm overall. Additionally or alternatively, it can provide its voltage level according to the respective specified value in the black-start mode or during black-start operation. This also comprises providing such a voltage that it takes into account a transformation ratio of one or more transformers connected between said wind power installation and the network connection point.

It is additionally or alternatively proposed that the wind power installation comprises a control apparatus according to one of the embodiments described above. Such a control apparatus can therefore be provided in a wind power installation in the wind farm. For example, a wind farm may have a plurality of wind power installations, some, in particular all, of which are suitable and prepared for a black-start mode or black-start operation, but one of which has a control apparatus described and can thereby guide the black-start mode or black-start operation. In this case, it is particularly advantageous that communication units and connections and possibly communication lines of the wind power installations can also be used to guide or coordinate such a black start by means of the control apparatus.

BRIEF DESCRIPTION OF THE SEVERAL VIEWS OF THE DRAWINGS

The invention is described in more detail below, by way of example, on the basis of embodiments with reference to the accompanying figures.

DETAILED DESCRIPTION

Figure 1:
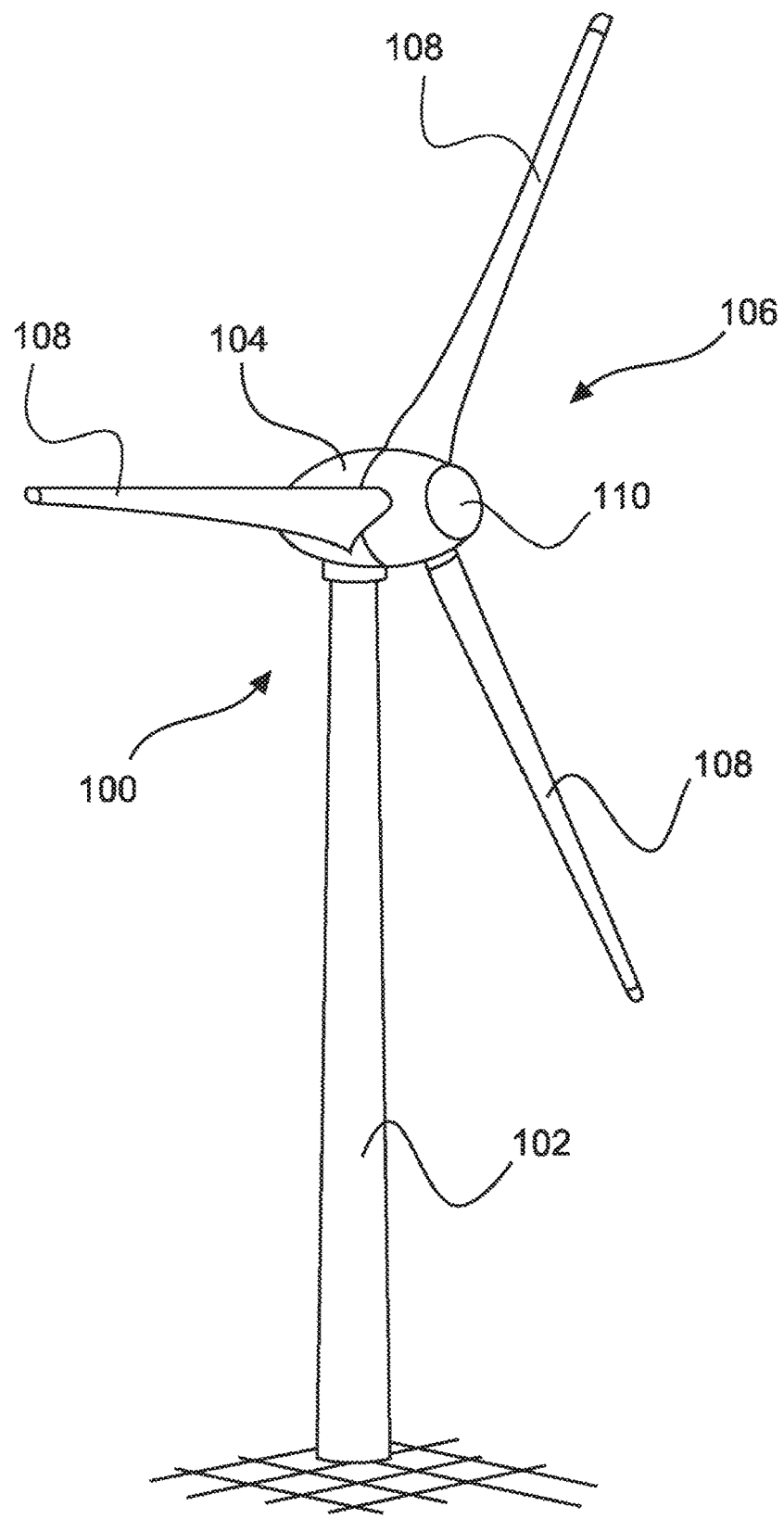
FIG. 1 shows a perspective view of a wind power installation.

FIG. 1 shows a wind power installation 100 having a tower 102 and a nacelle 104. A rotor 106 having three rotor blades 108 and a spinner 110 is arranged on the nacelle 104. During operation, the rotor 106 is caused to rotate by the wind and thereby drives a generator in the nacelle 104.

Figure 2:
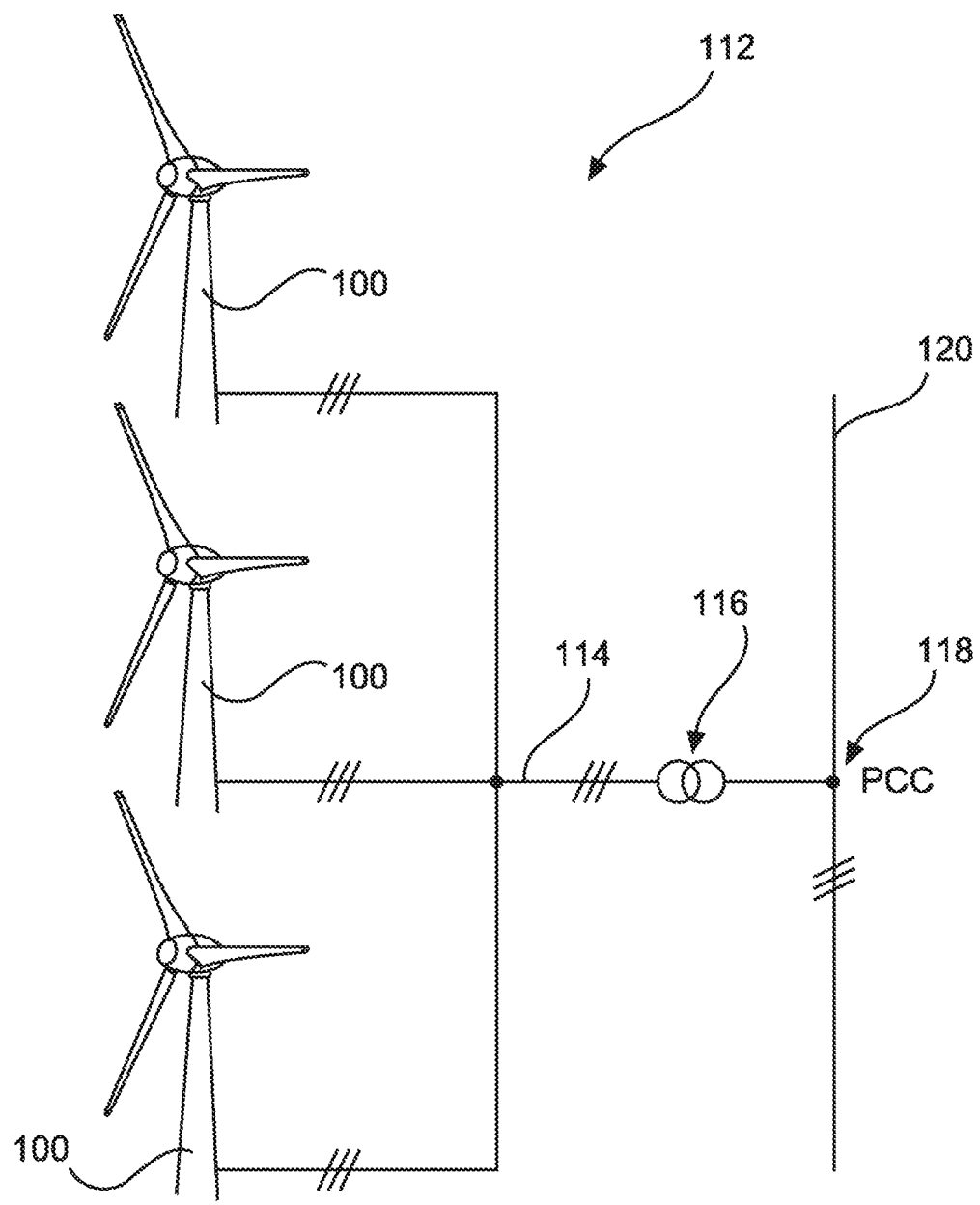
FIG. 2 shows a schematic illustration of a wind farm.

FIG. 2 shows a wind farm 112 having three wind power installations 100, by way of example, which may be the same or different. The three wind power installations 100 are therefore representative of fundamentally any desired number of wind power installations in a wind farm 112. The wind power installations 100 provide their power, namely the current produced in particular, via an electrical farm network 114. In this case, the currents or powers respectively generated by the individual wind power installations 100 are added, and a transformer 116 is usually provided, which transformer steps up the voltage in the farm in order to then feed it into the supply network 120 at the feed-in point 118 which is also generally referred to as the PCC. FIG. 2 is only a simplified illustration of a wind farm 112 which does not show any controller, for example, even though a controller is naturally present. The farm network 114 may also be different, for example, by virtue of a transformer, for example, also being present at the output of each wind power installation 100, to name just one other exemplary embodiment.

Figure 3:
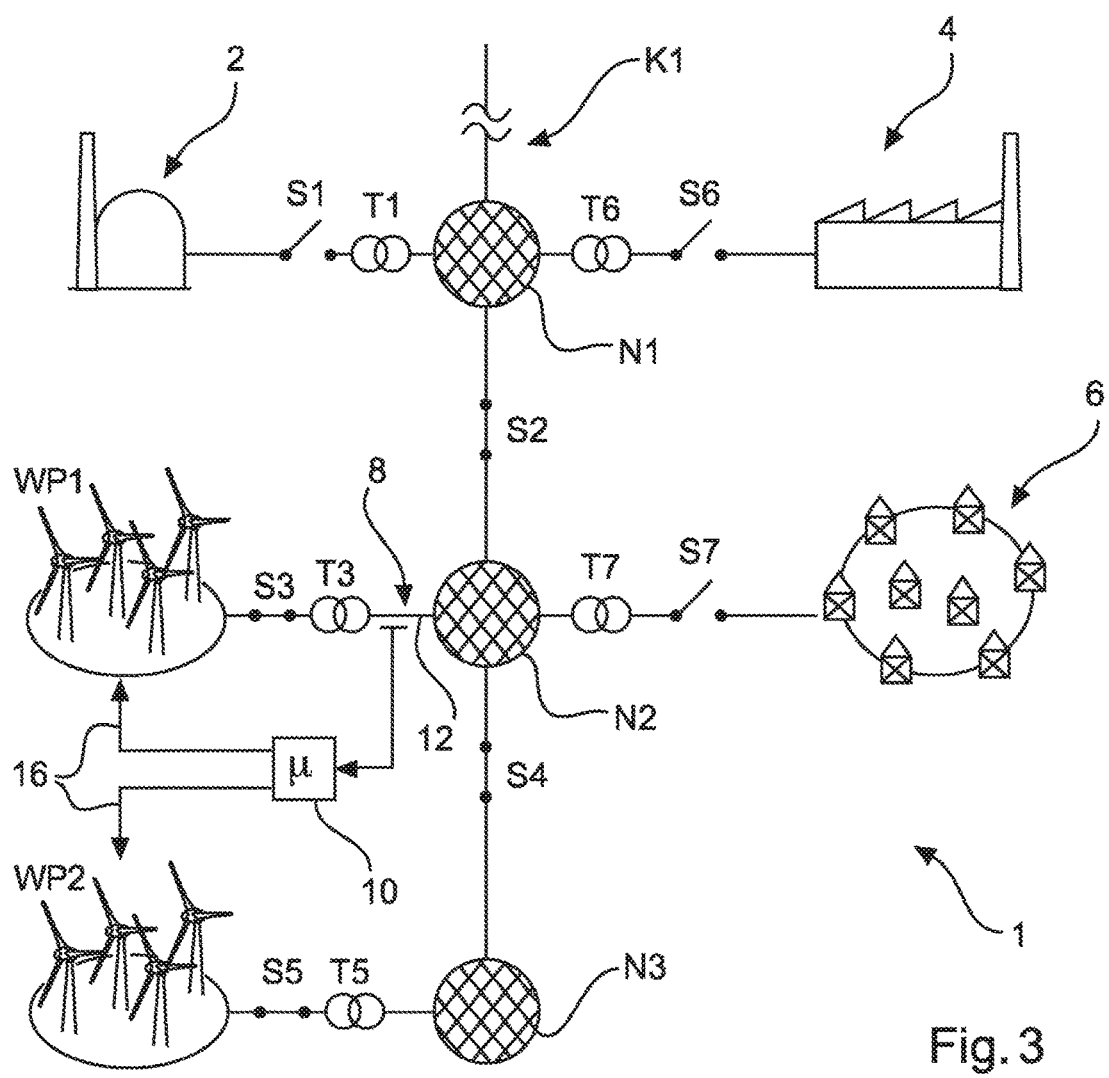
FIG. 3 schematically shows an electrical supply network for illustrating reactivation.

FIG. 3 shows a schematic illustration of a supply network 1. In this illustration, the electrical supply network 1 contains three subnetworks N1, N2 and N3 which can be disconnected from one another by means of the switches S2 and S4. In the illustration in FIG. 3, these two switches S2 and S4 are closed, however, and these three subnetworks N1-N3 therefore form, together with further elements, the electrical supply network 1. The electrical supply network 1, as illustrated in FIG. 3, can also be coupled to further parts, in particular to an overarching overall network such as the European integrated network, which is intended to be illustrated by the continuation symbol K1.

It should be emphasized that FIG. 3 is only a schematic and illustrative representation in many respects. In particular, the symbolized subnetworks N1-N3 can also be connected to one another more strongly, that is to say via a plurality of connecting points and not only via a switch S2 or S4, for example. In addition, switching elements, transformers, consumers and producers, to name just a few examples, also ultimately each belong to a supply network or subnetwork. Some of such elements are also described below in terms of their significance for the supply network 1.

In the embodiment according to FIG. 3, a first wind farm WP1 and a second wind farm WP2 are provided, which wind farms feed power into the electrical supply network 1, namely into the subnetwork N2 via the switch S3 and the transformer T3 and into the subnetwork N3 via the switch S5 and the transformer T5. In the situation shown, the two switches S3 and S5 are closed and the two wind farms WP1 and WP2 are therefore connected to the electrical supply network 1 and can feed in power.

A large power plant 2 is also illustrated and could feed power into the electrical supply network 1, namely into the subnetwork N1, via a switch S1 and a transformer T1. In the situation shown, the switch S1 is open, however, and the large power plant 2 therefore does not feed in power in the situation shown. Moreover, the large power plant 2 is only representative of other large power plants, in particular those which would feed in power via a synchronous generator directly coupled to the supply network 1. In this respect, the open switch S1 is representative of the fact that a large power plant 2 is currently not feeding power into the electrical supply network in the situation shown in FIG. 3.

An industrial consumer 4 is also illustrated by way of example and could obtain power from the electrical supply network 1 from the electrical supply network 1 via the transformer T6 and the switch S6. In the situation shown, the switch S6 is open, however, which therefore indicates that the exemplary industrial consumer 4 does not obtain any power from the electrical supply network 1 in the situation shown.

A city network 6 is likewise symbolically illustrated and is representative of many individual non-industrial consumers, in particular combined in a low-voltage network.

This city network 6 could also obtain power from the electrical supply network 1, namely via the transformer T7 and the switch S7. In the situation illustrated, the switch S7 is open, however, and the city network 6 therefore does not obtain any power from the electrical supply network 1 in the situation shown. The exemplary industrial consumer 4 also symbolizes a consumer which also obtains inductive power, at least with a considerably higher proportion than is the case in the city network 6.

In the situation illustrated in FIG. 3, only the two wind farms WP1 and WP2 are therefore currently coupled to the electrical supply network 1. However, they are currently initially not feeding in any power. In this respect, the two switches S3 and S5 could also be open. It is therefore assumed that the electrical supply network 1 shown, which can also be referred to only as a supply network 1 for the sake of simplicity, has failed, which can also be referred to as a blackout here. The electrical supply network 1 is therefore currently not operating.

A measurement is now carried out at the measuring point 8 in order to determine whether the electrical supply network 1 is operating. The measurement result is passed to the control apparatus 10 and is evaluated there. It is now determined in the control apparatus 10 that the electrical supply network 1 is not operating. This can be determined, in particular, by virtue of a voltage and/or a frequency not being captured (even though measurement errors can be excluded).

The control apparatus 10 detects this and decides whether it is expedient to start the two wind farms WP1 and WP2 shown by way of example in the black-start mode. For this purpose, the control apparatus 10 evaluates further information, namely both information relating to the state of the electrical supply network 1 and relating to the state of the two wind farms WP1 and WP2.

In this case, the state of the electrical supply network 1 can also be captured, and this is at least intended to be illustrated, at the measuring point 8. In particular, capture of the network impedance at the respective network connection point is proposed. However, these details are not illustrated in FIG. 3 and a measurement of the network impedance or capture of the network impedance should respectively refer to the network connection point or should be carried out there, in particular. In this respect, the wind farm WP1 feeds power into the electrical supply network 1 via the network connection point 12 which can locally correspond to the measuring point 8. The second wind farm WP2 feeds power into the supply network 1 via the network connection point 14.

The control apparatus 10 communicates with the first and second wind farms WP1 and WP2 via communication connections 16. As a result, the control apparatus can obtain information from the respective wind farm and can assess whether a start in the black-start mode may now be expedient. Such information is, in particular, how much power and/or reactive power the corresponding wind farm could actually currently provide and could therefore feed in. Said information relating to the electrical supply network, in particular the respective network impedance based on the network connection point 12 or 14, could also be obtained by the control apparatus 10 from the respective wind farm WP1 or WP2 as a result. In principle, it is also possible to dispense with the measuring point 8 if all information is provided by the relevant wind farm.

This information, that is to say information relating to the network state and relating to the current state and the current performance of the two wind farms WP1 and WP2 in particular, is now evaluated in the control apparatus 10, and the control apparatus 10 can then pass a starting signal to the two wind farms WP1 and WP2 in order to cause them to start in the black-start mode.

The two wind farms WP1 and WP2 can then first of all feed in reactive power, in particular, but partially or subsequently also active power. In this case, the two wind farms WP1 and WP2 are guided by the control apparatus 10, in particular with regard to a frequency and phase, in such a manner that they feed in power at a fixed frequency, in particular the nominal frequency of the electrical supply network, and therefore specify this frequency in the electrical supply network. In this case, the two wind farms WP1 and WP2 are synchronized with one another. It naturally also comes into consideration, in another embodiment, that only one wind farm feeds in power and specifies the frequency alone. Therefore, the wind farm(s) is/are not oriented to an existing frequency in the network, but rather specify/specifies said frequency.

At the same time, the two wind farms WP1 and WP2 can be guided in such a manner that they increase the network voltage, in particular.

The control apparatus 10 can also undertake the task of connecting consumers to the electrical supply network 1 as soon as the electrical supply network has corresponding stability. This can include closing the switches S6 and S7 illustrated by way of example at suitable times and therefore connecting the corresponding consumers, namely the industrial consumers 4 or the city network 6 in this case. However, this connection of the control apparatus 10 to the corresponding switches S6 and S7 is not illustrated for the sake of clarity.

Figure 4:
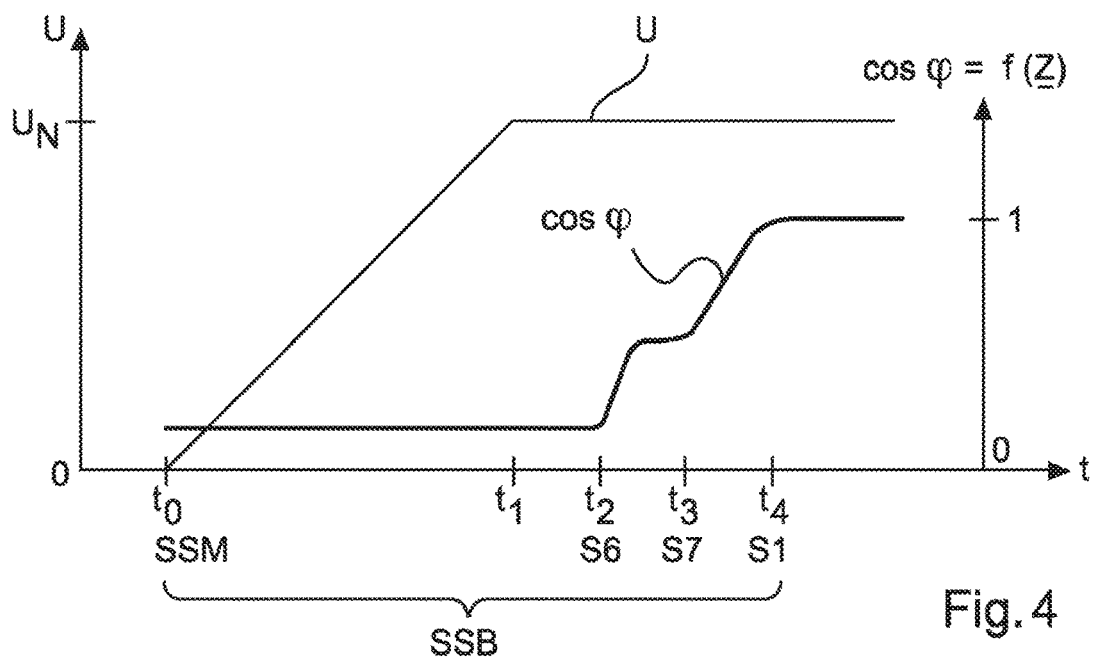
FIG. 4 schematically shows, in a graph, simplified profiles for a voltage U and a power factor $\cos\varphi$ for black-start operation.

The graph in FIG. 4 now explains, by way of example, how the electrical supply network can be started up in this manner with the aid of the two wind farms WP1 and WP2.

The graph shows the voltage U in the supply network 1 according to FIG. 3, for example at the measuring point 8, on the basis of time and shows the power factor cosφ of the two wind farms WP1 and WP2 overall.

At the time $t_0$, the control apparatus 10 has determined that the electrical supply network is not operating and has determined that it is useful to start the at least one wind farm, that is to say the wind farms WP1 and WP2 here. At the time $t_0$, a signal generator of the control apparatus 10 therefore passes a starting signal for starting the two wind farms in a black-start mode to these two wind farms WP1 and WP2. These two wind farms now switch to this black-start mode in order to start in said mode and adjust to black-start operation. This includes the fact that power is not immediately fed in with the nominal voltage or a similar voltage value, for example.

Accordingly, the voltage U is slowly increased from the time $t_0$ with the value 0 to the nominal voltage $U_N$. At the time $t_0$, the abbreviation SSM also indicates that the black-start mode is used here.

The nominal voltage $U_N$ could then be reached at the time $t_1$, in which case the network frequency is also present, for instance.

In this case, the two wind farms WP1 and WP2 substantially feed in reactive power, especially since no significant consumers are connected. Accordingly, the cosφ also has a low value close to 0. A lot of reactive power but little active power is therefore fed in.

It is then determined at the time $t_2$ that the voltage U could be held at the nominal voltage $U_N$ and first stable operation is now present. In this case, the industrial consumer 4, for example, is now connected, in particular by closing the switch S6 according to FIG. 3.

The voltage retains its value of the nominal voltage $U_N$, but certain fluctuations can also be regularly expected here which are not illustrated, however, for the sake of simplicity.

In addition, more active power is now fed in, with the result that the cosφ increases. By way of example, a cosφ which is not very high is nevertheless depicted here in order to indicate that a considerable portion of reactive power is still being fed in. In this case, it should also be noted that an industrial consumer regularly requires some reactive power.

If the supply network 1 now also operates in a stable manner with the connected industrial consumer 4, the city network 6 can be connected at the time $t_3$ by closing the switch S7. These operations naturally also take place with coordination in consultation with the affected consumers, that is to say with the industrial consumer 4 or an operator of the city network 6, for example with the relevant municipal utilities.

With the connection of the city network 6, even more active power is fed in and the reactive power can be slowly reduced.

It can then be assumed at the time $t_4$ that the supply network with the connected industrial consumer 4 and the connected city network 6 is operating in a stable manner and the large power plant 2 or further such power plants could then also be connected. It is therefore proposed to close the switch S1 at the time $t_4$, but only after the large power plant 2 has been accordingly started up. Depending on the circumstances, in particular depending on the type of large power plant 2 and depending on whether the latter has been shut down or is substantially still in a mode similar to a standby mode, the time $t_4$ at which the large power plant 2 mentioned by way of example is connected may be considerably later than indicated in FIG. 4. In particular, the intervals between $t_1$ and $t_2$ or $t_2$ and $t_3$ could be considerably shorter than the interval between $t_3$ and $t_4$.

In any case, operation from $t_0$, when the wind farms start in the black-start mode, to the time $t_4$, when the large power plant 2 is finally connected, can be considered to be black-start operation. With this last connection of the large power plant 2, all switches illustrated in FIG. 3, in particular the switches S1, S6 and S7, are finally closed and the electrical supply network 1 is then substantially in a normal state and the black-start operation can then be terminated or at least considered to be terminated. This may mean that the control apparatus 10 withdraws from the guidance of the two wind farms in the black-start operation and the wind farms then basically feed power into the electrical supply network 1 in an entirely normal manner.

Figure 5:
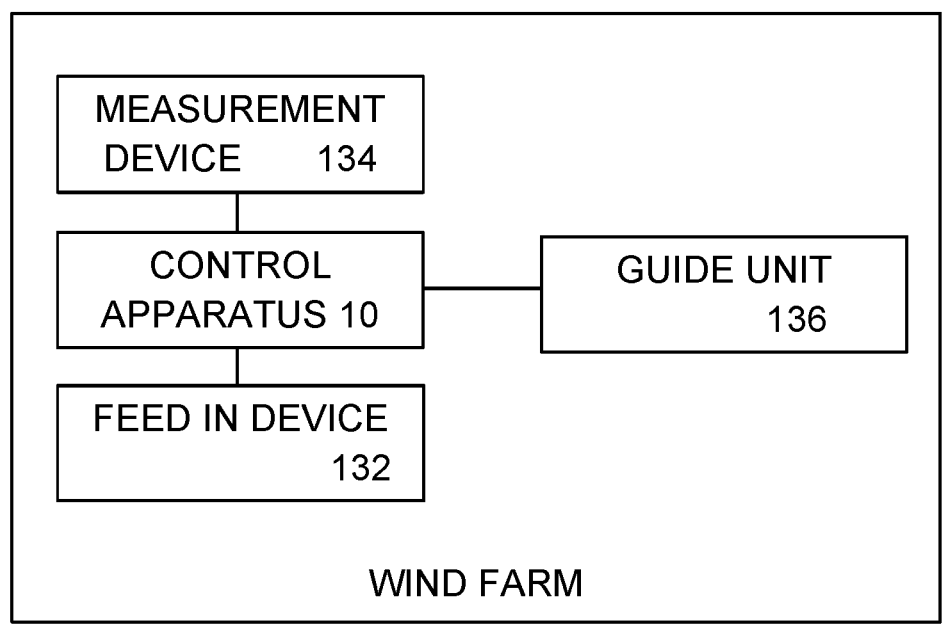
FIG. 5 is a block diagram of various components of a wind farm.

FIG. 5 shows a block diagram of various components of a wind farm 130. The wind farm 130 includes a feed-in device 132, a controller 10, a measurement device 134, and a guide unit 136.

The feed-in device 132 is any device configured to feed power into an electrical supply grid. For example, the feed-in device 132 may include an inverter for feeding the power into the electrical supply grid.

The measurement device 134 is any measurement device for detecting that the electrical supply network 1 is operating. For example, the measurement device 134 may be a voltage detector, a current detector, a power detector, or an electromagnetic detection device.

The measurement device 134 is coupled to the control apparatus 10 and configured to provide a signal indicative of a measurement of the electrical supply network to the control apparatus. The control apparatus 10 may be a processor, a controller, a microprocessor, or microcontroller, among others, may be any type of device configured to perform computational operations.

The control apparatus may include the feed-in device, the measurement device, and/or the guide unit, whereby all the devices may be part of a same control apparatus or separate devices. The functionality and operations described herein as being performed by the devices may be performed by the same control device or separate or different control devices. In one embodiment, the measurement device and the control apparatus work together to determine whether the electrical supply network is operating. It is to be appreciated that the measurement device and the control apparatus may be combined into a single device.

The invention claimed is:

1. A method comprising:

feeding electrical power into an electrical supply network by a wind farm connected to the electrical supply network by a network connection point, wherein the wind farm has a plurality of wind power installations, wherein the feeding comprises:

determining whether the electrical supply network is operating;

in the event the supply network is not operating, starting the wind farm in a black-start mode for a purpose of producing electrical power for feeding into the electrical supply network; and operating the wind farm in black-start operation in which electrical power generated by the wind farm is fed into the supply network and the electrical supply network is operated thereby, wherein a network frequency of the supply network is specified by the feeding-in of the electrical power in the black-start mode, during black-start operation or both.

2. The method as claimed in claim 1, wherein in the black-start mode, the wind farm is connected to the supply network via the respective network connection point, wherein:
the supply network is not operating before the connection, and
the supply network has the network frequency after connection as a result of the wind farm feeding in power.

3. The method as claimed in claim 1, wherein during black-start operation, a frequency generator generates a frequency signal, a phase signal, or both and provides the wind farm with said frequency, phase signals or both as control signals, and the wind farm sets the frequency, the phase, or both on the basis of this control signal.

4. The method as claimed in claim 1, wherein one of the plurality of wind power installations operates as a master installation for specifying the frequency, the phase or both, wherein remaining wind power installations of the plurality of wind power installations are synchronized with the master installation.

5. The method as claimed in claim 1, wherein electrical energy from an energy store is used to start the wind farm.

6. The method as claimed in claim 1, wherein before starting the wind farm, the method comprising:
capturing a network impedance at the network connection point;
determining an operational capability of the supply network; and
delaying starting the wind farm in the event the captured network impedance reveals that there is no operational capability of the supply network.

7. The method as claimed in claim 1, wherein during or after the starting of the wind farm in the black-start mode, at least one consumer connected to the supply network is connected in order to serve as a load for the power fed into the supply network such that an electrical current flows to the at least one consumer connected to the supply network.

8. The method as claimed in claim 1, wherein the starting in the black-start mode is initiated by an external signal from an operator of the supply network or a central control unit.

9. The method as claimed in claim 1, wherein before starting in the black-start mode, disconnecting a subnetwork of the supply network that is connected to the network connection point in order to be started and operated independently of the remaining part of the supply network, the method further comprising after operating the wind farm in the black-start operation, synchronizing the subnetwork a remaining part of the supply network and connecting the subnetwork to the remaining part of the supply network.

10. The method as claimed in claim 1, wherein the supply network has at least one consumer and a conventional production unit, wherein the conventional production unit has a nominal power of more than 200 MW, at least one synchronous generator coupled directly to the supply network, or both, wherein the conventional production unit is disconnected from the supply network in the event the supply network is not operating.

11. The method as claimed in claim 1, wherein at least two wind farms are provided and are started in a synchronous manner, wherein the at least two wind farms are matched to one another in terms of frequency and phase angle, wherein a first wind farm of the at least two wind farms operates as a master farm and any remaining wind farms of the at least two wind farms conform to the master farm.

12. The method as claimed in claim 1, wherein the wind farm is a plurality of wind farms, wherein the plurality of wind farms are configured to interchange data with one another in preparation for a joint start in the black-start mode, wherein the data relates to available power in the respective wind farm, power required in the supply network, or both, the method further comprising controlling the starting of the plurality of wind farms in the black-start mode.

13. The method as claimed in claim 1, further comprising determining available power, wherein the wind farm takes into account one or more of the following to determine the available power:
the prevailing wind,
expected wind, or
properties and size of storage devices present in the wind farm.

14. A control apparatus for controlling feeding electrical power into an electrical supply network by a wind farm connected to the supply network via a network connection point, wherein the wind farm has a plurality of wind power installations, the control apparatus comprising:
a capture means for determining whether the electrical supply network is operating;
a signal generator for generating and transmitting a starting signal for starting the farm in a black-start mode for the purpose of producing electrical power for feeding into the supply network in the event the supply network is not operating; and
a guide unit for guiding the at least one wind farm during black-start operation in which electrical power is fed into the supply network and the supply network is operated by the electrical power fed in,
wherein at least one of: while in the black-start mode or during black-start operation, a network frequency of the supply network is specified by the feeding-in of the electrical power by the wind farm.

15. A wind farm comprising:
a plurality of wind power installations; and
a control apparatus coupled to the plurality of wind power installations, wherein the controller apparatus is configured to:
determine whether an electrical supply network is operating;
in the event the supply network is not operating, cause the plurality of wind power installations to start in a black-start mode to produce electrical power; and
feed in the produced electrical power into the supply network such that the supply network is operated by the electrical power fed in, wherein a network frequency of the supply network is specified by the electrical power fed in.

16. A wind power installation comprising a control apparatus as claimed in claim 14.

17. The method as claimed in claim 1, wherein feeding comprises feeding electrical power into the electrical supply network by a plurality of wind farms connected to the electrical supply network by a plurality of network connection points, respectively, wherein one of the plurality of wind farms operates as a master farm for specifying at least one of frequency and phase and the remaining wind farms of the plurality of wind farms synchronize therewith.

* * * * *